(12) United States Patent
Moller et al.

(10) Patent No.: US 7,921,741 B2
(45) Date of Patent: Apr. 12, 2011

(54) ELECTROMAGNETIC TESTING MODEL OF HUMAN HAND

(75) Inventors: Paul J. Moller, Lake Zurich, IL (US); Boris M. Rubinstein, Palatine, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1882 days.

(21) Appl. No.: 11/013,007

(22) Filed: Dec. 15, 2004

(65) Prior Publication Data
US 2006/0128316 A1     Jun. 15, 2006

(51) Int. Cl.
*G01M 19/00* (2006.01)
(52) U.S. Cl. .................................. 73/866.4; 73/865.6
(58) Field of Classification Search ............. 73/866.4, 73/865.6
See application file for complete search history.

(56) References Cited

U.S. PATENT DOCUMENTS

| | | | | |
|---|---|---|---|---|
| 3,694,021 A | * | 9/1972 | Mullen | 294/106 |
| 6,181,136 B1 | * | 1/2001 | Choi et al. | 324/318 |
| 7,609,071 B2 | * | 10/2009 | Iwai et al. | 324/632 |
| 2004/0102694 A1 | * | 5/2004 | Iyama et al. | 600/410 |
| 2006/0204002 A1 | * | 9/2006 | Moller et al. | 379/441 |
| 2008/0151982 A1 | * | 6/2008 | Qi et al. | 375/227 |
| 2008/0261584 A1 | * | 10/2008 | Qi et al. | 455/423 |

\* cited by examiner

*Primary Examiner* — Hezron Williams
*Assistant Examiner* — Nashmiya Fayyaz
(74) *Attorney, Agent, or Firm* — Philip A. Premysler; Sylvia Chen

(57) ABSTRACT

Model human hands (902) for use in electromagnetic (e.g., microwave and RF) testing comprise a skeleton (1200, 104) of dielectric tubes (142, 148, 166, 170, 174, 178, 206, 208, 210, 1202, 1212, 1214, 1216, 1228, 1230, 1236, 1240, 1242, 194, 195, 196) inside a glove (908) that is filled with a fluid that has electrical properties that match that of a typical human hand at a particular frequency. According to certain embodiments the model hands comprise thumbs (193, 1236) that are located out of a plane of palms of the model hands. According to one embodiment the dielectric tubes are pivotally coupled to each other and biasing means (181, 702) are provided to bias the hand into a gripping position so that the model human hand is able to grip different types of wireless communication devices (802) in different ways.

22 Claims, 11 Drawing Sheets

ELECTROMAGNETIC TESTING MODEL OF HUMAN HAND

FIELD OF THE INVENTION

The present invention relates in general to microwave test equipment. More particularly, the present invention relates to models used in evaluating the effect of the human body on signals directed to and from wireless communication devices.

BACKGROUND OF THE INVENTION

The past decade has witnessed widespread adoption of personal wireless communication devices, including handheld cellular telephones, dedicated text messaging devices, and hybrid devices that combine communication and other functions. Wireless communication devices include antennas that are used to transmit and receive information-bearing RF and/or microwave signals. Antennas can be characterized by the efficiency with which they radiate and receive signals and by their gain patterns, which characterize how well the antenna can transmit and receive signals in each direction.

Handheld wireless communication devices differ from larger radio communication equipment in that they are typically operated in close proximity to a person's body, e.g., held at the side of a person's face. From an electromagnetic view point, the human body is an irregularly shaped object in which the complex permittivity (conductivity and permittivity) is spatially distributed. Although considered in isolation, an antenna of a wireless communication device can be analyzed and understood using a variety of mathematical methods, placing the antenna near a person's body complicates matters and can dramatically change the performance of the antenna from what is predicated based on mathematical models of the antenna in isolation. Interaction with a person's body may lead to loss of signal energy, and alteration of the gain pattern.

In order to better understand the effect of a user's body on antenna performance, models of the human head that are suitable for electromagnetic testing have been made. These models typically take the form of a hollow molded model of a head that is filled with a electrolyte solution that is intended to simulate the bulk electromagnetic properties of a person's head. Models of a human hand have also been constructed from carbon-and-aluminum loaded silicone rubber. However, such human hand models suffer from the deficiency that the position of the fingers is substantially fixed so that they can not be manipulated to grip devices of different shapes and sizes in different ways. In as much as people hold wireless devices in different ways, it is desirable to have a model hand that has similar flexibility and dexterity. Also, once constructed, the electromagnetic properties of such model hands are fixed, so that they are matched to a human hand at one particular frequency, and unsuitable for testing at other frequencies or for evaluating a range of human hand electrical characteristics.

BRIEF DESCRIPTION OF THE FIGURES

The present invention will be described by way of exemplary embodiments, but not limitations, illustrated in the accompanying drawings in which like references denote similar elements, and in which.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Figure 1:
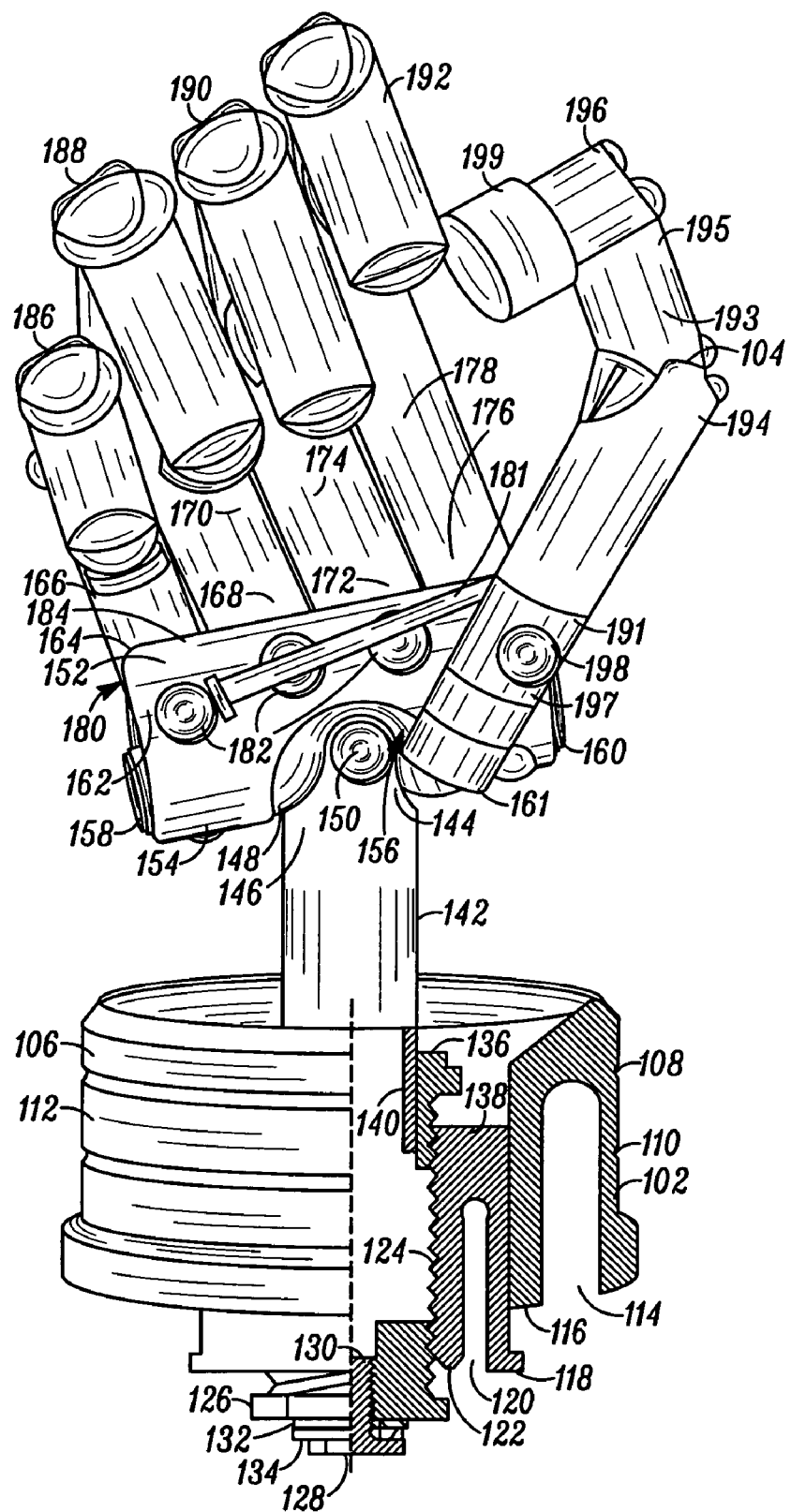
FIG. 1 is a partially sectioned front view of a base and a skeleton of an electromagnetic testing model hand according to a first embodiment.
Figure 2:
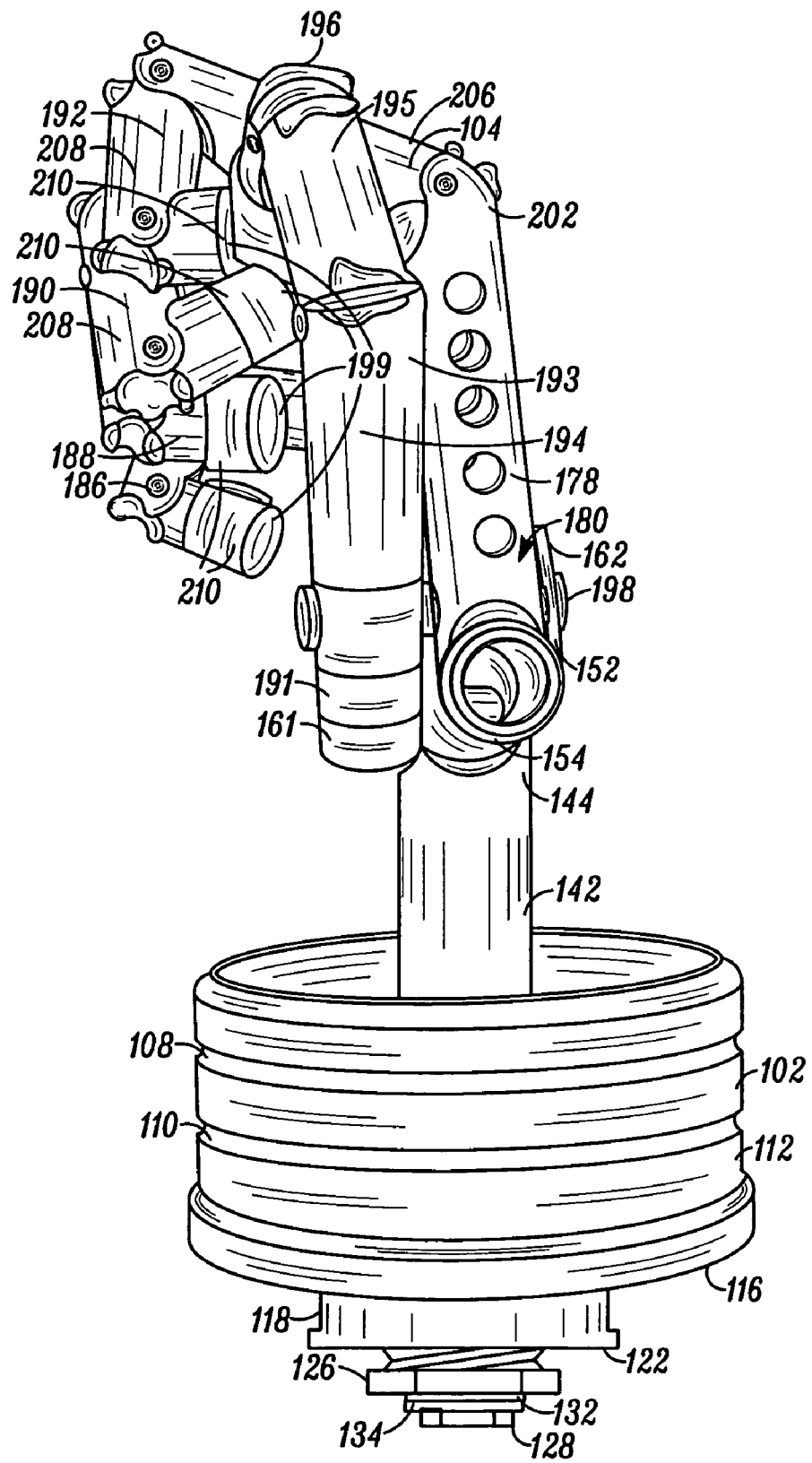
FIG. 2 is a thumb-side view of the base and skeleton of the electromagnetic testing model hand shown in FIG. 1.
Figure 3:
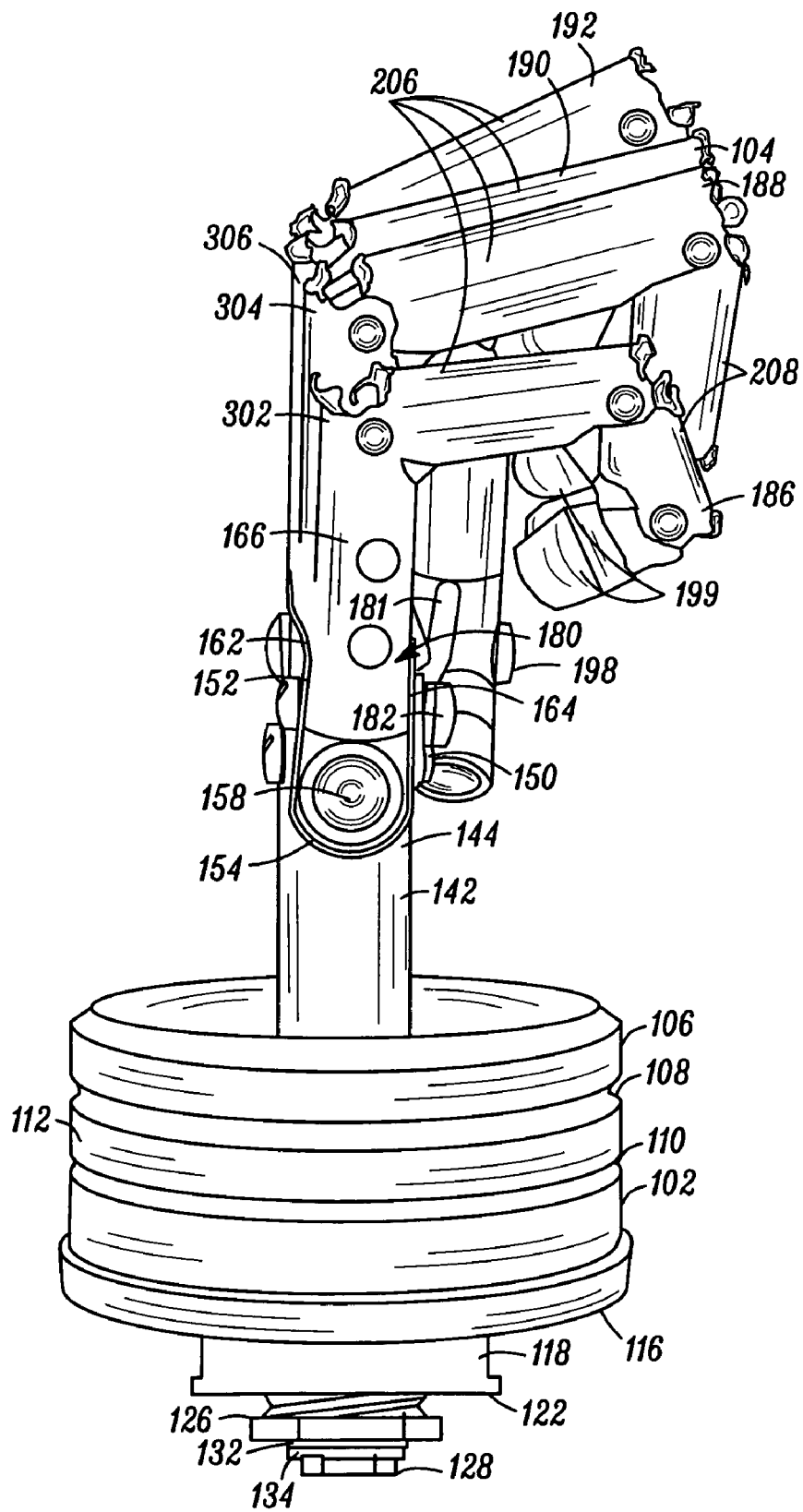
FIG. 3 is a pinky-side view of the base and skeleton of the electromagnetic testing model hand shown in FIG. 1.
Figure 4:
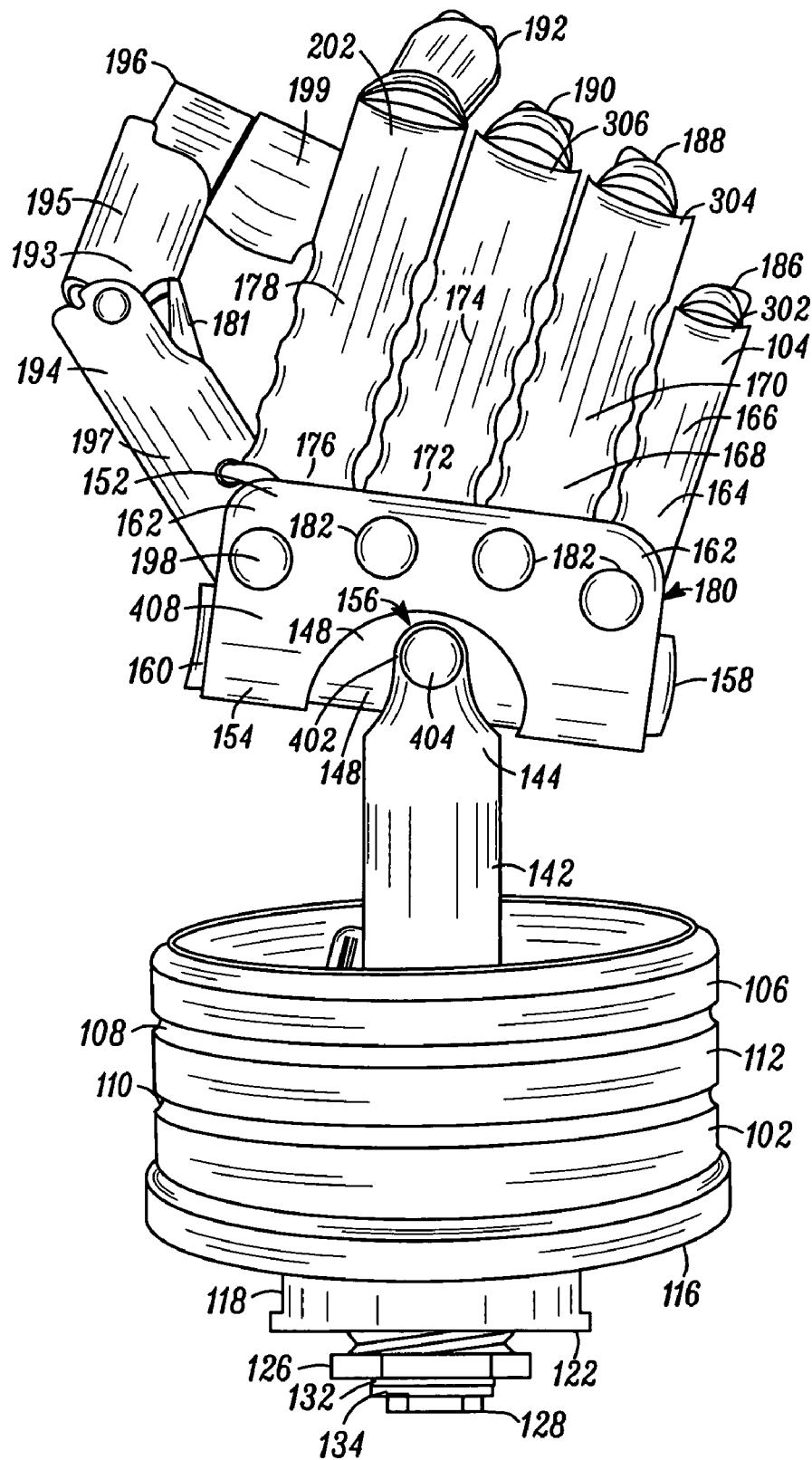
FIG. 4 is a back-side view of the base and skeleton of the electromagnetic testing model hand shown in FIG. 1.
Figure 9:
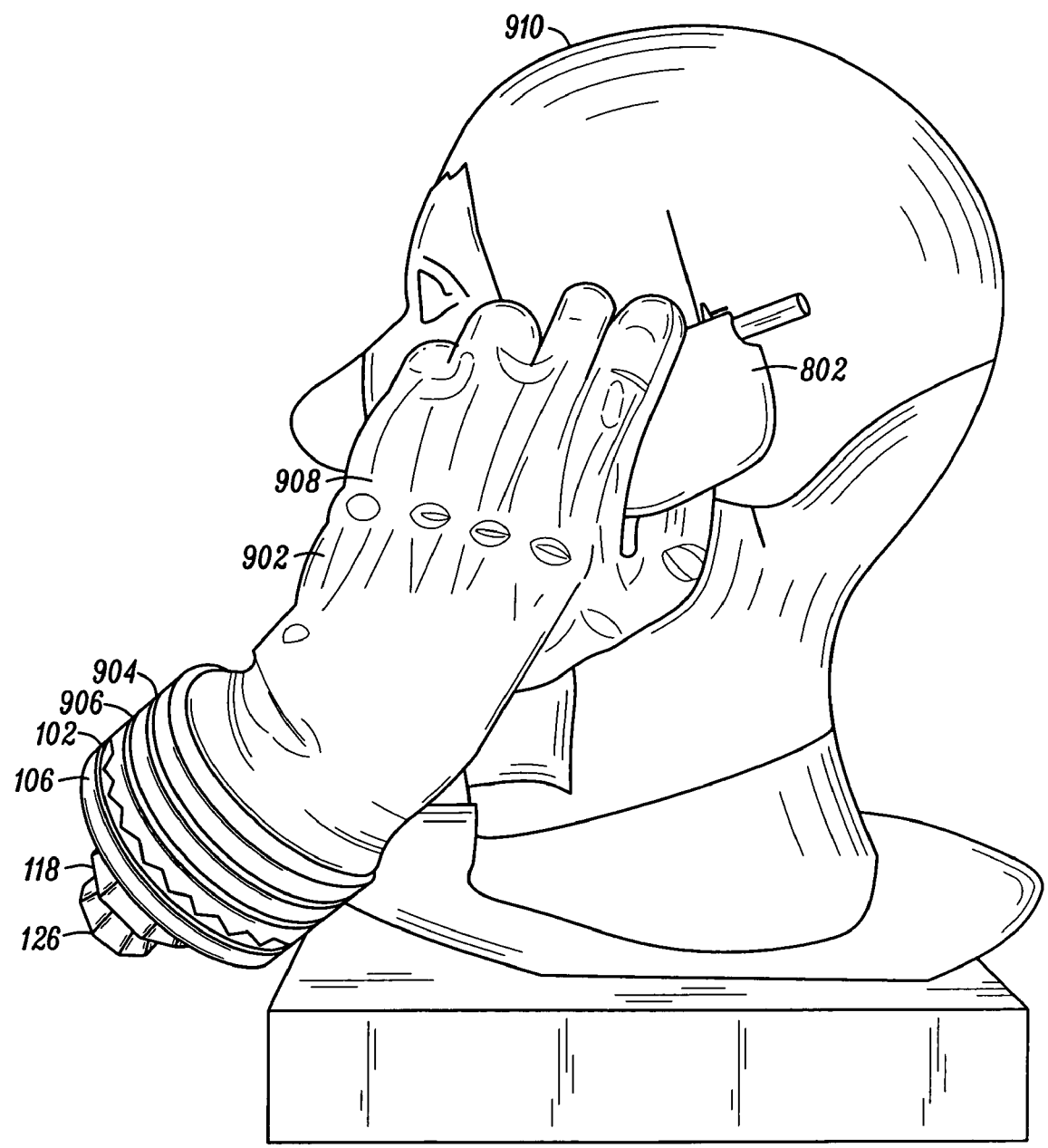
FIG. 9 is a view of the assembled electromagnetic testing model hand of FIG. 1 shown gripping a wireless telephone that is positioned proximate a electromagnetic testing model of a human head.

FIG. 1 is a partially sectioned front view of a base 102 and a skeleton 104 of an electromagnetic testing model hand 902 according to a first embodiment. The complete model hand 902 is shown in FIG. 9. FIG. 2 is a thumb-side view of the base 102 and skeleton 104, FIG. 3 is a pinky-side view of the base 102 and skeleton 104 and FIG. 4 is a back-side view of the base 102 and skeleton 104.

In the embodiment shown in FIGS. 1-9, the base 102 is constructed from off-the-shelf PVC pipe fittings. An outer part 106 is made from a 3" by 1½" (76.2 mm by 38.1 mm) water pipe adapter. A first annular groove 108 and a second annular groove 110 are cut in a peripheral cylindrical surface 112 of the outer part 106. The first annular groove 108 and the second annular groove 110 are sized to accommodate a first O-ring 904 and a second O-ring 906 when a glove 908 of the testing model hand 902 is fitted over the skeleton 104 and base 102 (see FIG. 9). The grooves 108, 110 help to form a fluid seal between the glove 908 and the base 102. A series of arcuate pockets 114 that extend axially upward from a bottom end 116 of the outer part 106 are spaced azimuthally in the outer part 106. The arcuate pockets 114 lighten the outer part 106.

An intermediate adaptor 118 is made from a 1½" by ¾" (38.1 mm by 19.05 mm) PVC adaptor. The intermediate adaptor 118 is fitted into the bottom end 116 of the outer part 106 and is suitably sealed in the outer part 106 using a PVC adhesive. The intermediate adaptor 118 has an annular pocket 120 that extends upward from a bottom end 122 of the intermediate adaptor 118. The annular pocket 120 lightens the intermediate adaptor 118. An internal thread 124 extends the full length of the intermediate adaptor 118. A plug 126 is screwed into the internal thread 124 of the intermediate adaptor 118 from the bottom end 122 of the intermediate adaptor 118. A dielectric screw 128 is threaded into a threaded axial hole 130 in the plug 126. A rubber washer 132 and a plastic washer 134 are used to form a seal between the dielectric screw 128 and the plug 126.

The dielectric screw 128 and/or the plug 126 are used to introduce a fluid into the model hand 902. The fluid is discussed further below. A smaller adaptor 136 is screwed into the internal thread 124 of the intermediate adaptor 118 from a top end 138 of the intermediate adaptor 118. The smaller adaptor 136 is suitably made from a ¾" by ½" (19.05 mm by 12.7 mm) PVC pipe adaptor. The smaller adaptor 136 has an axial plain through hole 140. Although, as a matter of expedience, PVC pipe fittings were used in constructing the base 102 of the embodiment shown in FIG. 1, it will be appreciated by those skilled in the art, that the base 102 can alternatively be made using custom formed parts.

A forearm tube 142 is fitted into the plain hole 140 of the smaller adaptor 132 and is suitably sealed in the plain hole using a PVC adhesive. The forearm tube 142 extends upward from the base 102. A distal end 144 of the forearm tube 142 is contoured to form a first ear 146 and a second ear 402. A length of PVC pipe or other dielectric material is suitably used as the forearm tube 142. A traverse tube 148 is located between the first ear 146 and the second ear 402. The traverse tube 148 extends substantially perpendicularly in two directions from the forearm tube 142. A dielectric fastener 150 extends through a hole (not visible) in the first ear 146 through holes (not visible) in the traverse tube 148, and through another hole (not visible) in the second ear 402. The first ear 146 and the second ear 402 are long enough to allow the traverse tube 148 to rotate, through a limited range, about an axis coaxial with the dielectric fastener 404.

A metacarpal tube connecting member 152 takes the form of a sheet of dielectric material (e.g. resin-impregnated fiberglass cloth) formed into a semi-oval shape, as is seen most clearly in FIGS. 2-3, including a radiused portion 154. The radiused portion 154 has an inside radius that matches an outside radius of the traverse tube 148. The traverse tube 148 is located in the metacarpal tube connecting member 152 against the radiused portion 154. The forearm tube 142 connects to the traverse tube 148 through a medial opening 156 in the radiused portion 154. A first plastic sleeve 158 and a second plastic sleeve 160 which serve to protect the glove 908 (FIG. 9) from being cut on sharp edges of the traverse tube 148 and the metacarpal tube connecting member 152 are fitted into opposite ends of the traverse tube 148. Corners 162 of the metacarpal tube connecting member 152 are radiused to avoid cutting the glove 908 as well.

A proximal end 164 of a first metacarpal tube 166, a proximal end 168 of a second metacarpal tube 170, a proximal end 172 of a third metacarpal tube 174 and a proximal end 176 of a fourth metacarpal tube 178 extend into the metacarpal tube connecting member 152 through a chordal opening 180 in the metacarpal tube connecting member 152. A set of three fasteners 182 extend through holes (not visible) in a front side 184 of the metacarpal tube connecting member 152 though holes (not visible) in the first 166, second 170 and third 174 metacarpal tubes and through holes (not visible) in a back side 408 of the metacarpal tube connecting member 152. The way in which the fourth metacarpal tube 178 is secured is described below. The first through fourth metacarpal tubes 166, 170, 174, 178, the traverse tube 148 and the metacarpal tube connecting member 152 and associated fasteners make up a palm of the model hand 902.

A pinky finger 186 is connected to a distal end 302 of the first metacarpal tube 166; a ring finger 188 is connected to a distal end 304 of the second metacarpal tube 170; a middle finger 190 is connected to a distal end 306 of the third metacarpal tube 174; and an index finger 192 is connected to a distal end 202 of the fourth metacarpal tube 178. In the embodiment shown in FIGS. 1-9, the construction of the fingers 186, 188, 190, 192 is the same with the exception that each is dimensioned according the proportions of a typical human hand. Each finger 186, 188, 190, 192 comprises a proximal phalanx tube 206 pivotally coupled to one of the metacarpal tubes 166, 170, 174, 178, a middle phalanx tube 208 pivotally coupled to the proximal phalanx tube 206 and a distal phalanx tube 210 pivotally coupled to the middle phalanx tube 208.

The metacarpal tubes 166, 170, 174, 178, the traverse tube 148, the proximal phalanx tubes 206, the middle phalanx tubes 208, and the distal phalanx tubes 210 are suitably fiberglass tubes. Fiberglass tubes exhibit a relatively low microwave and RF cross-section, such that their effect on the microwave and RF properties of the model hand 902 is small compared to that of the fluid fill of the model hand, and thus the microwave and RF properties can be more easily controlled by controlling the microwave and RF properties of the fluid fill.

Figure 5:
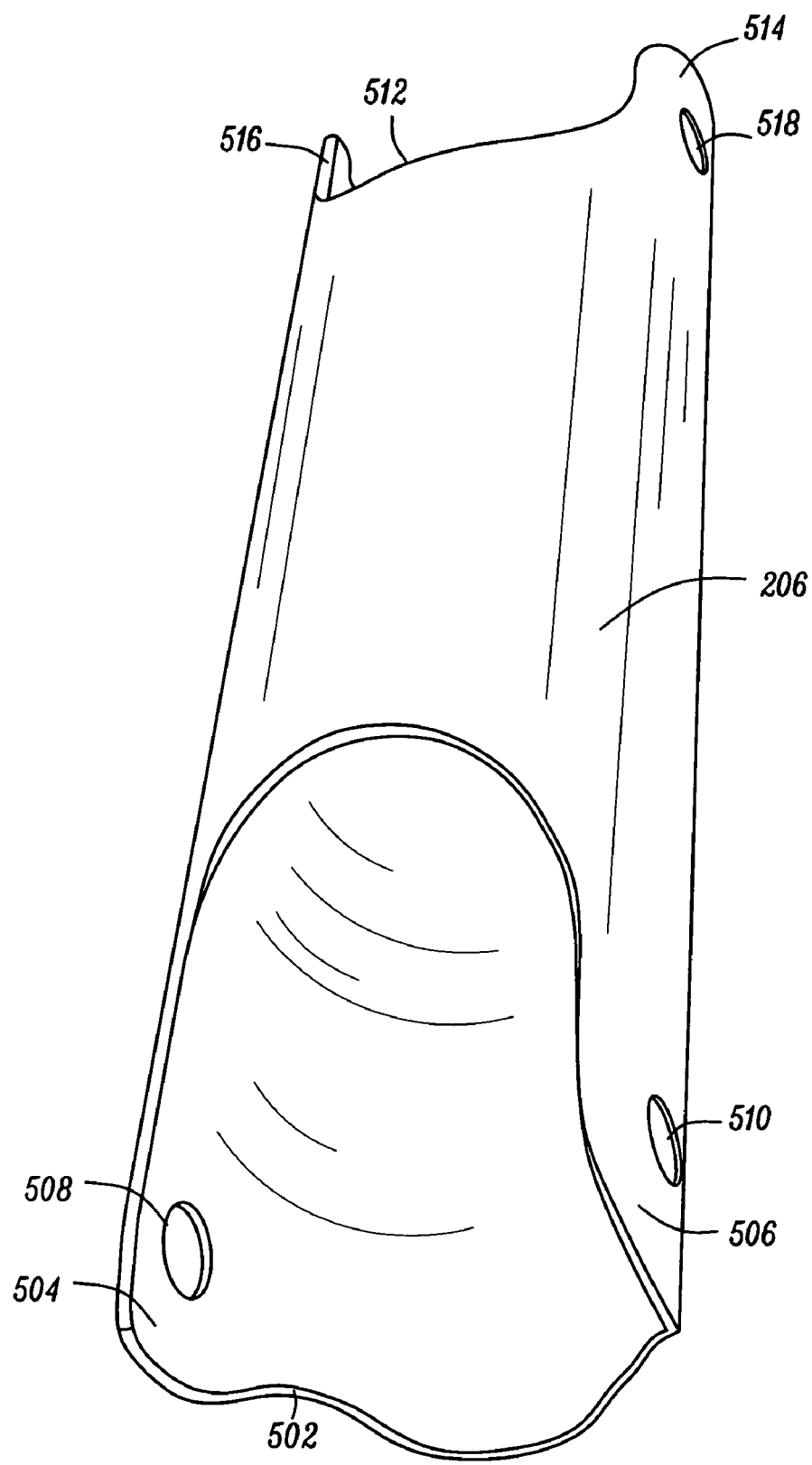
FIG. 5 is a detailed view of a proximal phalanx tube of the skeleton shown in FIG. 1.

FIG. 5 is a detailed view of one of the proximal phalanx tubes 206 of the skeleton shown in FIG. 1. As shown in FIG. 5, the proximal phalanx tube 206 comprises a first end edge 502 that is contoured to include a first ear 504 and a second ear 506 diametrically opposite the first ear 504. A first hole 508 is provided in the first ear 504 and a second hole 510 is provided in the second ear 506. Similarly, a second end edge 512 includes a third ear 514 and a fourth ear 516 which include a third hole 518 and a fourth hole (not visible) respectively. In the assembled model hand 902 the first hole 508 and the second hole 510 are aligned with other holes in similar ears in an end of an adjacent tube (one of the metacarpal tubes 166, 170, 174, 178 or middle phalanx tubes 208) and a first fastener is passed through the first hole 508 and one of the other holes of the adjacent tube and a second fastener is passed through the second hole 510 and one of the other holes of the adjacent tube.

The centers of the first hole 508, the second hole 510 and other holes of an adjacent tube with which they are aligned are pivot points about which the proximal phalanx tube 206 and the adjacent tube rotate with respect to each other. The proximal phalanx tube 206 is shown in FIG. 5 with the front (palm side) facing up. Note that the contours of the first end edge 502 and the second end edge 512 are extended relatively deeply from the ends of the proximal phalanx tube 206 on the inside (palm side) compared to the outside. This allows the fingers 186, 188, 190, 192 to be curled into a grip without having the various tubes interfere with each other. Other tubes of the fingers 186, 188, 190, 192 are similarly constructed and attached to allow for rotation relative to each other.

Figure 6:
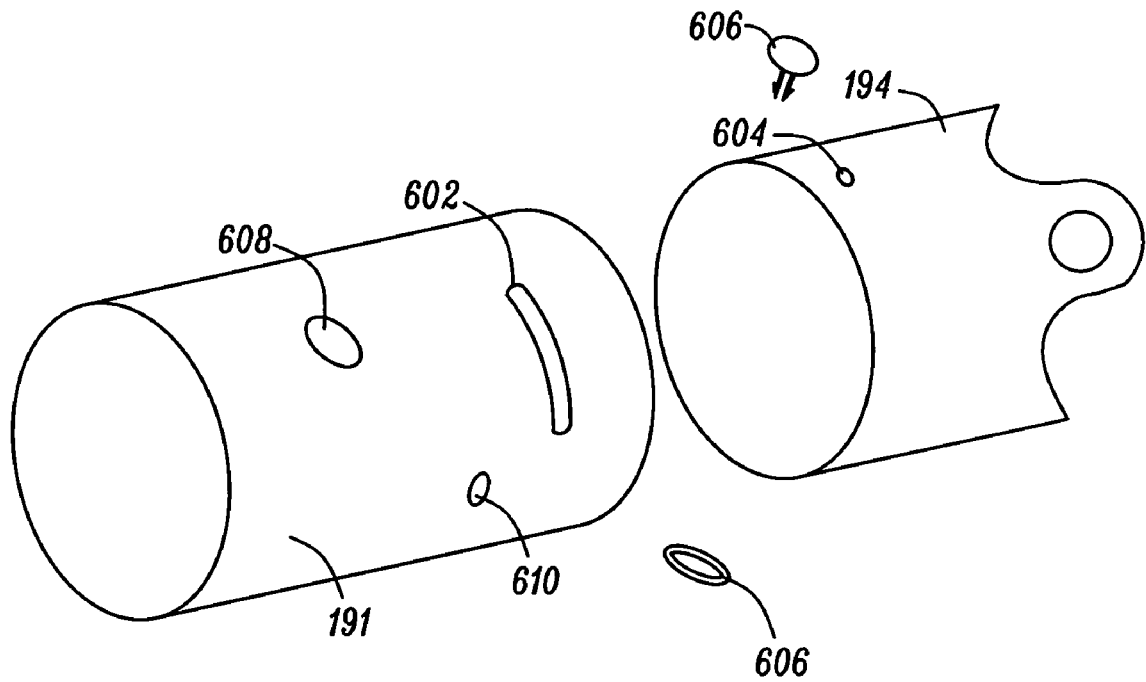
FIG. 6 is an exploded detail view showing a thumb base and a thumb metacarpal tube of the model hand shown in FIG. 1.

The skeleton 104 further comprises a thumb 193 including, including a thumb base tube 191, a thumb metacarpal tube 194, a thumb proximal phalanx tube 195 and a thumb distal phalanx tube 196. The latter three are coupled to each other in the previously described manner that the tubes of the fingers 186, 188, 190, 192 are coupled to each other. The thumb base tube 191 and the thumb metacarpal tube 194 are connected to each other in a different manner. FIG. 6 is an exploded detail exploded view showing the thumb base tube 191 and thumb metacarpal tube 194. The thumb metacarpal tube 194 is slip fit over the thumb base tube 191, allowing the thumb metacarpal tube 194 and the entire thumb 193 to swivel relative to the palm of the model hand 902. The thumb base tube 191 includes a circumferentially oriented slot 602. When the thumb metacarpal tube 194 is fitted over the thumb base tube 191, a hole 604 in the thumb metacarpal tube 194 aligns with the slot 602, and a dielectric fastener 606 is passed through the slot 602 and the hole 604. The arrangement of the slot 602, first hole 604 and fastener 606 serves to secure the thumb metacarpal tube 194 to the thumb base tube 191 while allowing the thumb metacarpal tube 194 to swivel about an axis that is coaxial with the thumb metacarpal tube 194.

Whereas the metacarpal tubes 166, 170, 174, 178 are arranged in a common plane, the thumb metacarpal tube 194 is located out of the common plane, but parallel to the common plane. The thumb base tube 191 is attached to the metacarpal tube connecting member 152 and the fourth metacarpal tube 178 by a thumb fastener 198 that passes diametrically through a first hole 608 and second diametrically opposite hole (not shown) in the thumb base tube 191, through the front side 184 of the metacarpal tube connecting member 152, diametrically through the fourth metacarpal tube 178, and through the back side 408 of the metacarpal tube connecting member 152. The thumb 193 is able to rotate about an axis that is coaxial with the thumb fastener 198. Thus, the thumb 193 is able to rotate about one axis and swivel about another, perpendicular axis. These degrees of freedom allow the model hand to be configured into a variety of different grips so that the effect of various grips on antenna performance can be evaluated.

A third plastic sleeve 161 which serves to prevent the proximal end 197 of the thumb metacarpal tube 194 from cutting the glove 908 is fitted into a proximal end 197 of the thumb base tube 191. Alternatively, rounded rubber caps or plastic inserts are used in lieu of the plastic sleeves 158, 160, 161. Contoured edges of the tubes 166, 170 174, 178, 194, 195, 196, 206, 208, 210 of the skeleton 104 are alternatively coated with a bead of adhesive (e.g. RTV silicone) in order to prevent cutting of the glove 808 on the contoured edges.

Figure 7:
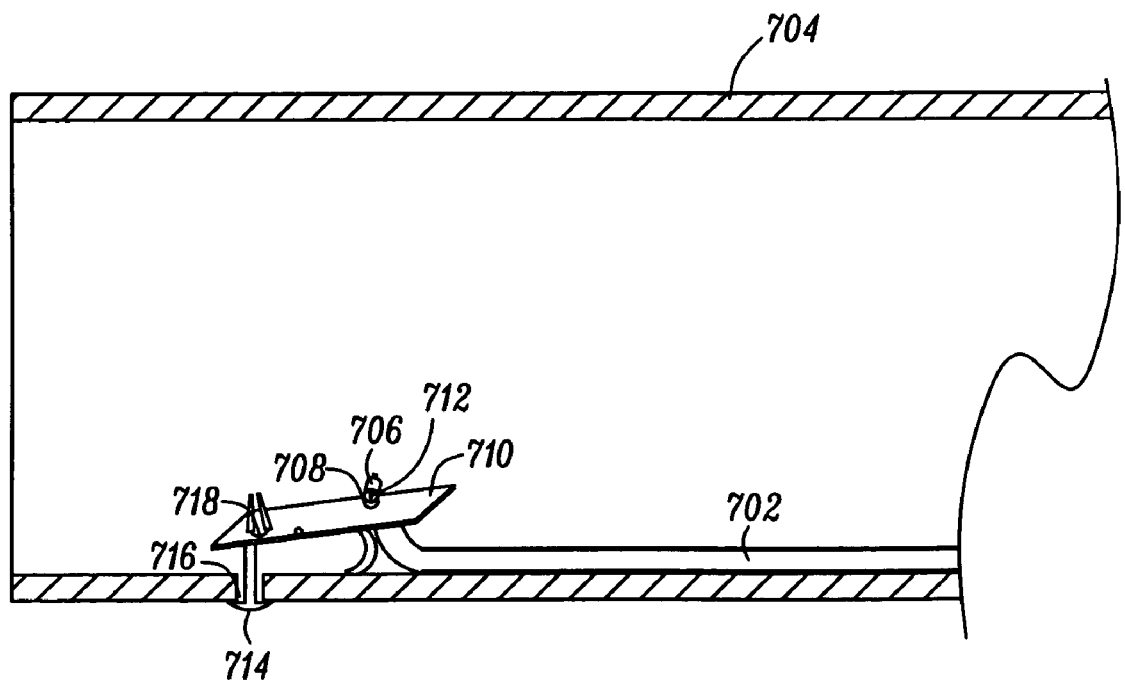
FIG. 7 is a fragmentary sectional view showing a connection of an elongated resilient member to the end of a tube of the skeleton shown in FIG. 1.

FIG. 7 is a fragmentary sectional view showing a connection of an elongated resilient member 702 to the end of a tube 704 of the skeleton 104 shown in FIG. 1. Each of the fingers 186, 188, 190, 192 is biased into a curled position by one of four elongated resilient members 702. One of the four elongated resilient members 702 is connected to an anchor point in one of the metacarpal tubes 166, 170, 174, 178 and another anchor point in one of the distal phalanx tubes 210. Each of the elongated resilient members 702 is anchored at one end in one of the metacarpal tubes 166, 170, 174, 178, and extends through the connected proximal phalanx tube 206, middle phalanx tube 208 and distal phalanx tube 210 and is anchored in the distal phalanx tube 210. Thus, the tube 704 shown in FIG. 7 represents one of the metacarpal tubes 166, 170, 174, 178 or one of the distal phalanx tubes 210.

In FIG. 7, the tube 704 is sectioned lengthwise to reveal the manner in which the elongated resilient member 702 is anchored. The elongated resilient member 702 suitably comprises a length of latex surgical tubing. An end 706 of the elongated resilient member 702 is folded over and passed through a first hole 708 in a flat plastic piece 710. A plastic dowel 712 is passed through the folded-over end 706 of the elongated resilient member 702 in order to help secure the elongated resilient member 702 in the first hole 708. A dielectric fastener 714 passes through a hole 716 in the front of the tube 704 and through a second hole 718 in the flat plastic piece 710. In this manner the elongated resilient member 702 is secured to the front facing side of the tube 704. Securing the elongated resilient members 702 to the front of the distal phalanx tubes 210 and the front of the metacarpal tubes 166, 170, 174, 178 biases the fingers 186, 188, 190, 192 into a curled gripping position, as opposed to an open extended position.

An additional elongated resilient member 181 serves to bias the thumb 193 into a curled position and to bias the thumb 193 toward the palm of the model hand 902. A first end of the additional elongated resilient member 181 is attached to the metacarpal tube connecting member 152 by an additional flat plastic piece 710, and plastic dowel 712 and one of the first set of four fasteners 182 that secures the first metacarpal tube 166. The additional elongated resilient member 181 passes through an additional hole 610 in the thumb base tube 191, through the thumb base tube 191, through the thumb metacarpal tube 194, through the thumb proximal phalanx tube 195 and into the thumb distal phalanx tube 196. The additional elongated resilient member 181 is secured at a second anchor point in the thumb distal phalanx tube 196 in the manner shown in FIG. 7.

Five soft rounded caps 199 are positioned over distal ends (not visible) of the distal phalanx tubes 210 of the fingers 186, 188, 190, 192 and the thumb distal phalanx tube 196. The soft rounded caps 199 provide some compliance which simulates human finger tips, and protects the glove 908 from sharp edges of the distal ends.

Figure 8:
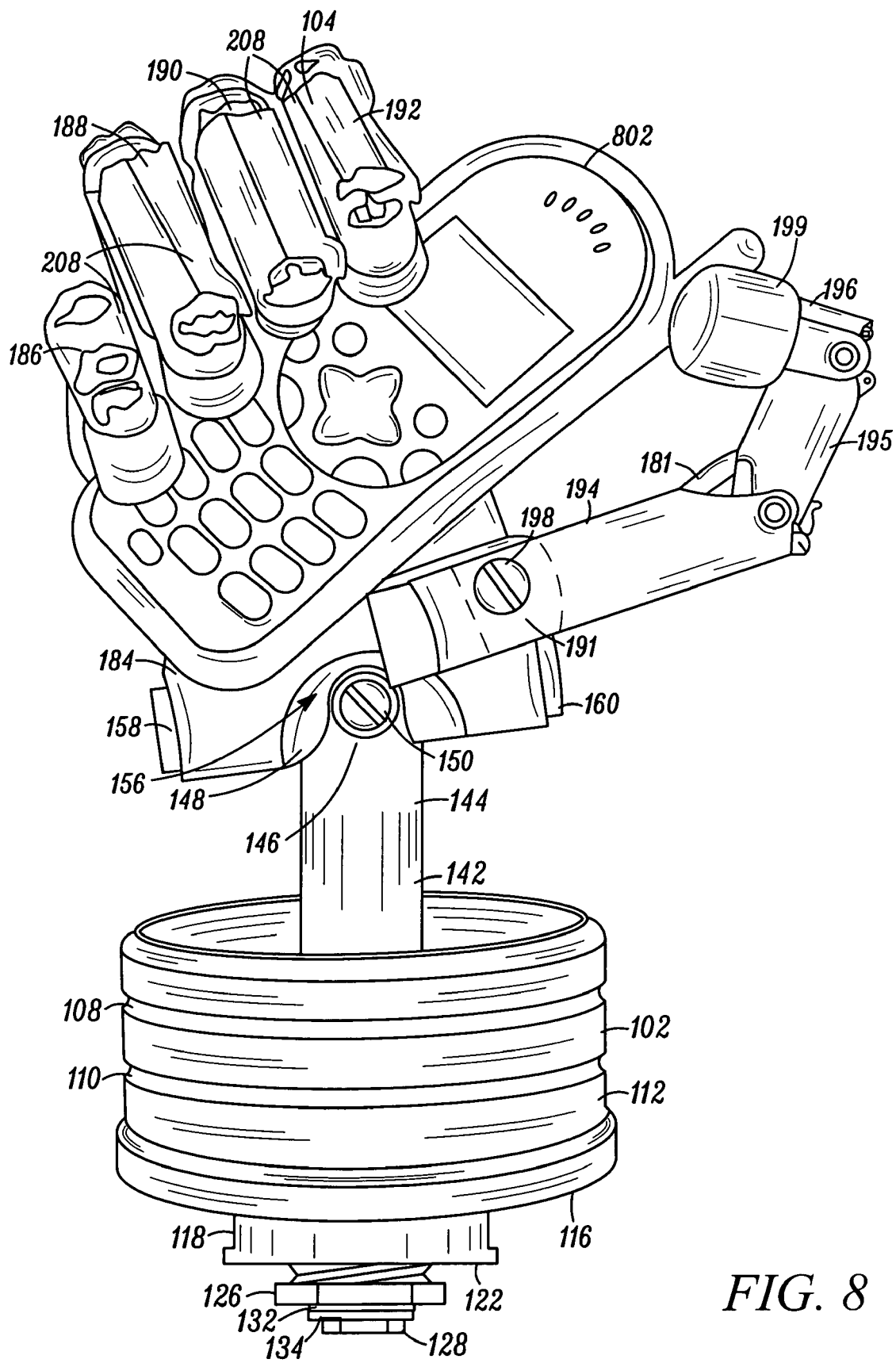
FIG. 8 is a front view of the base and skeleton of the electromagnetic testing model hand of FIG. 1 shown gripping a wireless telephone.

FIG. 8 is a front view of the base 102 and skeleton 104 of the electromagnetic testing model hand 902 shown gripping a wireless telephone 802. Although one particular grip position is shown in FIG. 8, given the fact the skeleton 104 is highly articulated, it is able to grip different styles of wireless communication devices with different grips.

FIG. 9 is a view of the assembled electromagnetic testing model hand 902 shown gripping the wireless telephone 802 that is positioned proximate an electromagnetic testing model of a human head 910, also known as a "phantom head". The model hand 902 and the phantom head 910 are useful in studying the interaction of wireless signals transmitted from or received by the wireless telephone 802 with the human body. Knowledge of this interaction yields better understanding of the way in which the human body has the potential to degrade the quality of wireless communication signals and alter the gain pattern of antennas of wireless communication devices. Such information is useful in endeavoring to design improved wireless communication devices.

A glove 908 of the model hand 902 is filled with a predetermined quantity of fluid. The quantity of fluid is selected so that the volume of the model hand approximates the volume of a typical human hand consistent with the dimensions of the skeleton 104. Overfilling the glove 908 will cause the glove to balloon into an unnatural shape. In filling the glove 908, care is taken, not to admit any air. For phantom heads such as 910, which have existed for some time, the fluid fill that is used, consistent with the electromagnetic properties of human heads, exhibits a certain relative dielectric constant and conductivity at a particular frequency of interest.

In comparison, the human hand has a relatively low conductivity and is primarily dielectric in character. Solutions of $C_{12}H_{22}O_{11}$ and $H_2O$ (sugar and water respectively) are mainly dielectric in character (with small conductivities); however as the concentration of $C_{12}H_{22}O_{11}$ in solution is increased in order to decrease the permittivity to match that of a human hand, it is found that maximum solubility of $C_{12}H_{22}O_{11}$ is reached before the permittivity matches that of a typical human hand. The inventors have found, however, that a supersaturated amorphous solution of $C_{12}H_{22}O_{11}$ in a $H_2O$, commonly known as molasses can more accurately match the permittivity and conductivity of a typical human hand. An appropriate concentration of molasses is determined by diluting the molasses until the permittivity approximates that of a human hand. Like a human hand, molasses exhibits a low conductivity (compared to other tissues).

In as much as the wavelengths of most common wireless communication signals are large compared to the cross-sectional dimensions of the human hand, and the volume occupied by the fluid fill of the model hand 902 is large compared to the volume of the wall of the glove 908, and the volume displaced by the skeleton 104 (which is largely hollow), the microwave and RF properties of the model hand 902 are dominated by the microwave and RF properties of the fluid fill. This latter fact makes it easy to change the properties of the model hand, for example, for testing at different frequencies, by simply changing the fluid fill.

Figure 10:
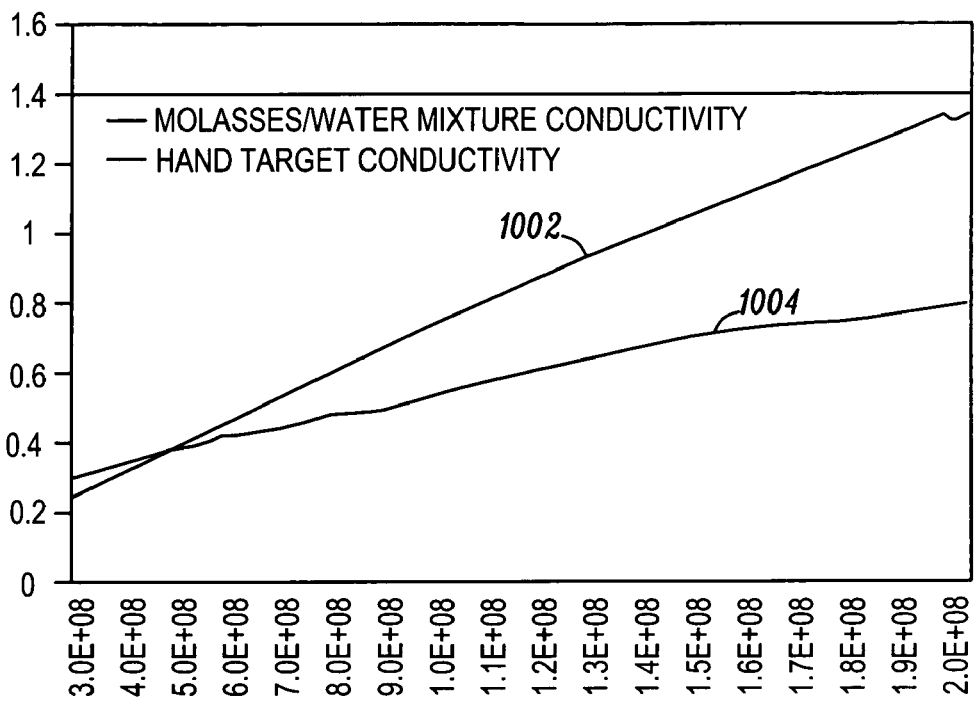
FIG. 10 is a graph including plots of conductivity versus frequency for a mixture of molasses and water that can be used in the electromagnetic testing model hand shown in FIG. 1 and for an actual human hand.
Figure 11:
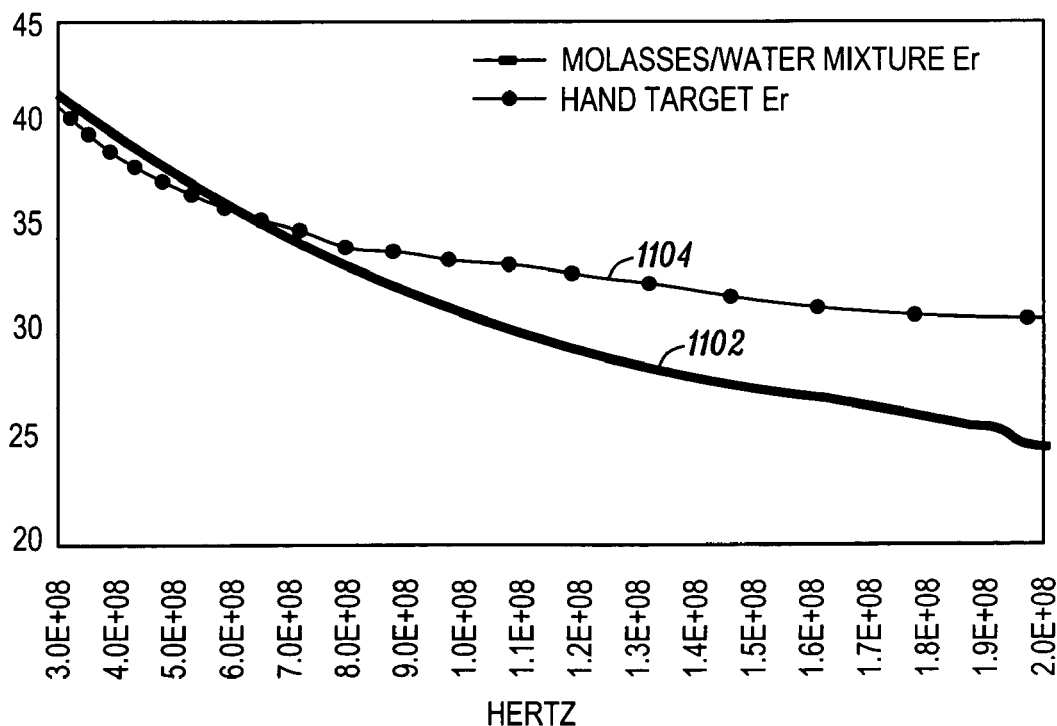
FIG. 11 is a graph including plots of relative permittivity versus frequency for the mixture of molasses and water that can be used in the electromagnetic testing model hand shown in FIG. 1 and for a human hand.

FIG. 10 and FIG. 11 show the relationship between the electrical characteristics of a human hand and a mixture of molasses and water suitable for use in the model hand for testing devices operating at 300-2000 Mhz. The concentration of the mixture of molasses and water was determined by routine testing, guided by the knowledge that increasing the percentage of water tends to increase the dielectric constant. FIG. 10 is a graph including plots of conductivity versus frequency for a mixture 1002 of molasses and water and a human hand 1004. FIG. 11 is a graph including plots of relative permittivity versus frequency for the same mixture 1102 of molasses and water and the same human hand 1104. Note that in the vicinity of 500 Mhz, the mixture of molasses and water approximates the electrical characteristics of the human hand.

Figure 12:
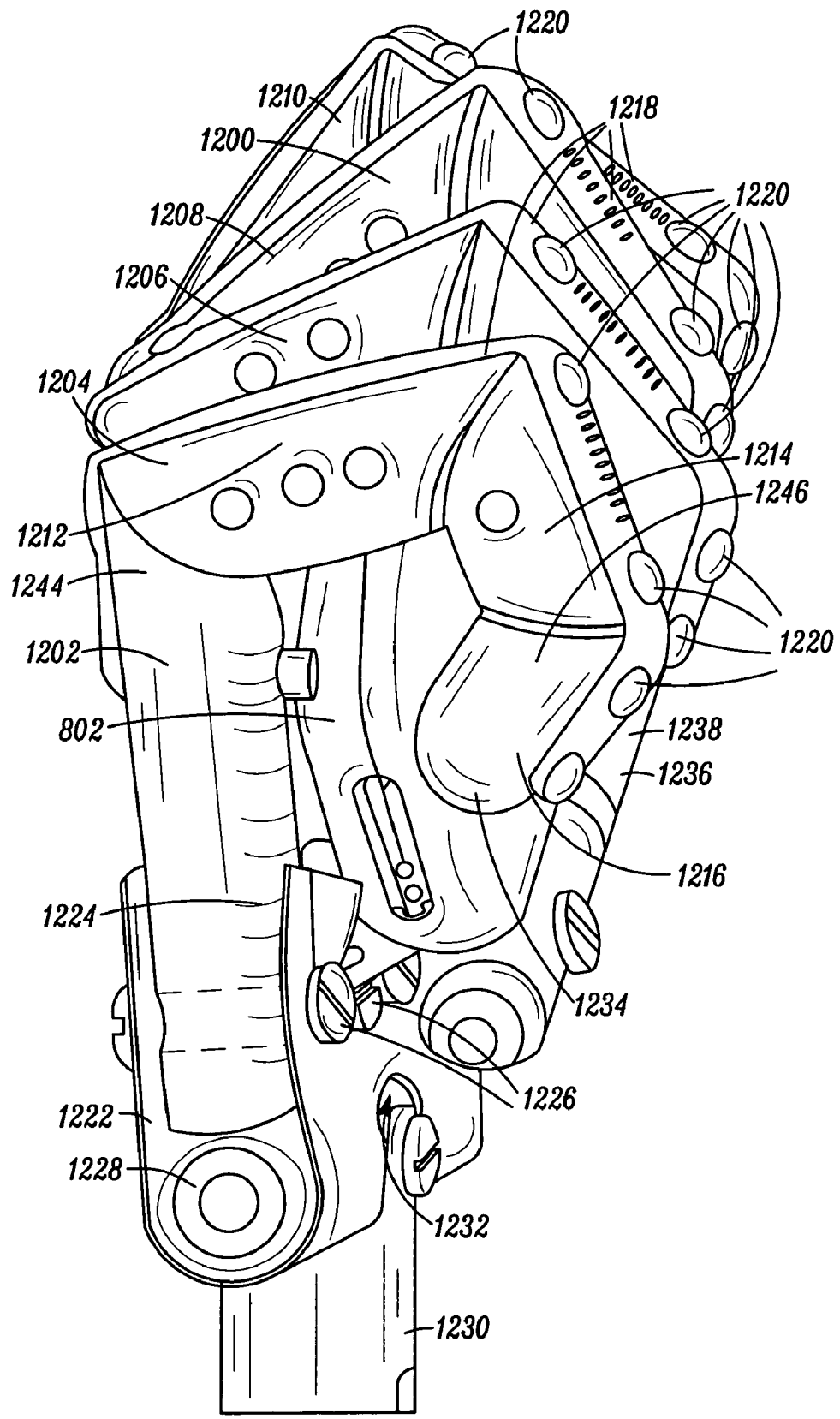
FIG. 12 is pinky-side view of a skeleton of an electromagnetic testing model hand according to an alternative embodiment.
Figure 13:
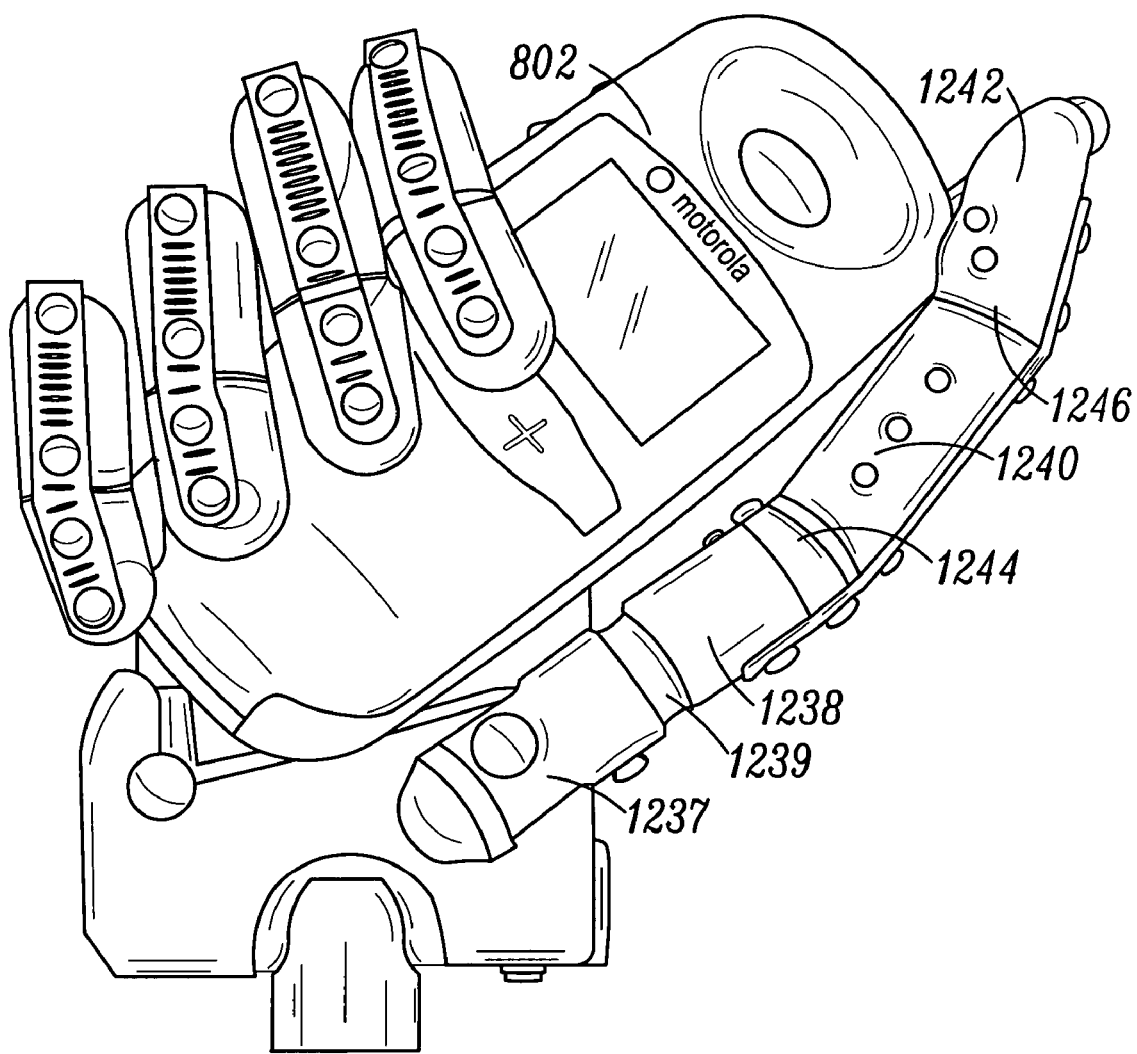
FIG. 13 is a front view of the skeleton shown in FIG. 12.

FIG. 12 is pinky-side view of a skeleton 1200 of an electromagnetic testing model hand according to an alternative embodiment and FIG. 13 is a front view of the skeleton 1200 shown in FIG. 12. The skeleton 1200 also comprises four tubes 1202 (one of which is visible in FIG. 12) of a metacarpal section of the skeleton 1200. One of a pinky finger 1204, a ring finger 1206, a middle finger 1208 and an index finger 1210 is connected to each of the four tubes 1202 of the metacarpal section. Each finger 1204, 1206, 1208, 1210 includes a sequence of three tubes, including, a proximal phalanx tube 1212, a middle phalanx tube 1214, and a distal phalanx tube 1216.

One of four plastic strips 1218 connects one of the four tubes 1202 of the metacarpal section to one of the proximal phalanx tubes 1212, one of the middle phalanx tubes 1214, and one of the distal phalanx tube 1216 of one of the fingers 1204, 1206, 1208, 1210 of the skeleton 1200. The plastic strips 1218 are connected to the four tubes 1202 of the metacarpal section and the tubes 1212, 1214, 1216 that make up the fingers 1204, 1206, 1208, 1210 by dielectric fasteners 1220. A semi-oval shaped metacarpal tube connecting member 1222 is connected to proximal ends 1224 of the four tubes 1202 of the metacarpal section by a plurality of dielectric fasteners 1226. A traverse tube 1228 is disposed in the metacarpals tube connecting member 1222 underneath the proximal ends 1224 of the four tubes 1202.

A forearm tube 1230 connects to the traverse tube 1228 through a medial opening 1232 in the metacarpal tube connecting member 1222. Distal ends 1234 of the distal phalanx tubes 1216 are hemispherical in shape to simulate the rounded shape of finger tips. A thumb 1236 is connected to the metacarpal tube connecting member 1222 and one of the four tubes 1202. The thumb 1236 comprise a thumb base tube 1237, swivel coupling tube 1239, a thumb metacarpal tube 1238, thumb proximal phalanx tube 1240 and a thumb distal phalanx tube 1242. The thumb swivel coupling tube 1239 is slip fit into the thumb base tube 1237 and the thumb metacarpal tube and allows the thumb 1236 to pivot about an axis that is coaxial with the thumb metacarpal tube 1238. (See FIG. 6.)

The thumb 1236 is attached to the metacarpal tube connecting member 1222. The thumb metacarpal tube 1238 is displaced from a common plane in which the four tubes 1202 are located. Distal ends 1244 of the four tubes 1202 and the thumb metacarpal tube 1238, proximal ends 1246 of the distal phalanx tubes 1216 and the thumb distal phalanx tube 1242, and both ends of the middle phalanx tubes 1214, and the proximal phalanx tubes 1212, and the thumb proximal phalanx tube 1240 are cut at selected angles such when the four tubes 1202 and the tubes that comprise the fingers 1204, 1206, 1208, 1210 are held together by the plastic strips 1218 the skeleton 1200 will be in a curled finger position suitable for gripping a wireless communication device such as the wireless telephone 802 as shown.

While the preferred and other embodiments of the invention have been illustrated and described, it will be clear that the invention is not so limited. Numerous modifications, changes, variations, substitutions, and equivalents will occur to those of ordinary skill in the art without departing from the spirit and scope of the present invention as defined by the following claims.

What is claimed is:

1. A model hand for use in electromagnetic testing comprising:
    a base;
    a plurality of dielectric tubes coupled together to form a skeleton of said model hand, wherein said plurality of dielectric tubes is coupled to said base;
    a glove fitted over said skeleton of said model hand; and
    a fluid filling said glove, said fluid having a conductance and permittivity selected to approximate electrical characteristics of a human hand at one or more frequencies for simulating and evaluating a range of human hand electromagnetic characteristics.

2. The model hand according to claim 1 wherein:
    said glove comprises an opening that is fitted over said base and said glove is sealingly engaged with said base.

3. The model hand according to claim 2 wherein said base comprises a peripheral surface including one or more annular grooves that extend around said peripheral surface, wherein said glove covers said annular grooves, and one or more o-rings are disposed over said glove in said annular grooves so as to sealingly engage said glove with said peripheral surface of said base.

4. The model hand according to claim 1 wherein:
    said plurality of dielectric tubes comprises:
        a first set of four tubes forming a palm of the model hand wherein each of said first set of four tubes comprises a proximal end and a distal end; and
        four sequences of three interconnected tubes one of which is attached to said distal end of each of said first set of four tubes, wherein each of said four sequences of three interconnected tubes forms one of four fingers of said model hand, and each sequence of three interconnected tubes includes a proximal phalanx tube, a middle phalanx tube, and a distal phalanx tube.

5. The model hand according to claim 4 wherein:
each distal phalanx tube comprises a distal end; and
a cap having a round end is fitted to said distal end of each distal phalanx tube.

6. The model hand according to claim 4 wherein each sequence of three interconnected tubes is pivotally attached to one of said first set of four tubes and said proximal phalanx tube, said middle phalanx tube and said distal phalanx tube in each sequence of three interconnected tubes are pivotally coupled to each other; and
said model hand further comprises a plurality of resilient members for biasing one or more of said four fingers into a curled position, such that the model hand grips objects placed in the model hand.

7. The model hand according to claim 6 wherein said plurality of resilient members comprise:
four elongated resilient members wherein each elongated resilient member extends from a first anchor point in a metacarpal section through one of the first set of four tubes, through one of the sequences of three interconnected tubes connected to one of the first set of four tubes to a second anchor point in one of the distal phalanx tubes of one of the sequences of three interconnected tubes.

8. The model hand according to claim 7 wherein said four elongated resilient members comprise latex.

9. The model hand according to claim 4 wherein
said first set of four tubes are arranged in a common plane; and
said model hand comprises a thumb, comprising a thumb metacarpal tube disposed substantially parallel to but displaced from said common plane, a thumb proximal phalanx tube pivotally coupled to said thumb metacarpal tube and a thumb distal phalanx tube pivotally coupled to said thumb proximal phalanx tube.

10. The model hand according to claim 9 further comprising one or more resilient members for biasing said thumb into a curled position.

11. The model hand according to claim 9 wherein:
said thumb is pivotally coupled to a metacarpal section.

12. The model hand according to claim 11 further comprising:
a resilient member extending between said thumb and said metacarpal section for biasing said thumb towards said metacarpal section.

13. The model hand according to claim 12 wherein said resilient member comprises an elongated elastomeric member that extends from a first anchor point on said metacarpal section into said thumb metacarpal tube, through said thumb metacarpal tube and through said thumb proximal phalanx tube to a second anchor point in said thumb distal phalanx tube, whereby said thumb is biased into a curled position as well as being biased towards said metacarpal section.

14. The model hand according to claim 11 wherein said thumb comprise a thumb base that is coupled to said metacarpal section, and said thumb metacarpal tube is rotationally coupled to said thumb base such that said thumb metacarpal tube is able to rotate about an axis that is coaxial with said thumb metacarpal tube.

15. The model hand according to claim 9 wherein:
said thumb metacarpal tube is pivotally attached to one of said first set of four tubes by a dielectric fastener, so as to be able to pivot about a pivot axis.

16. The model hand according to claim 4 further comprising:
a metacarpal tube connecting member comprising a sheet of dielectric material formed into a semi-oval shape having a chordal opening in which said proximal ends of said first set of four tubes are disposed, wherein said proximal ends of said first set of four tubes are attached to said metacarpal tube connecting member by a plurality of dielectric fasteners.

17. The model hand according to claim 16 wherein:
said metacarpal tube connecting member comprises a radiused portion having a radius, and a medial opening in said radiused portion;
said model hand further comprising a transverse tube having a radius substantially equal to said radius of said metacarpal tube connecting member, said traverse tube disposed in said metacarpal tube connecting member, proximate said radiused portion; and
said model hand further comprises a forearm tube connected through said medial opening to said transverse tube.

18. The model hand according to claim 17 wherein said forearm tube is pivotally coupled to said traverse tube, whereby said metacarpal tube connecting member is able to rotate through a range of rotation with respect to said forearm tube.

19. The model hand according to claim 4 wherein:
one or more ends of each of said first set of four tubes and each of said sequences of three interconnected tubes comprise end edges contoured to form two opposed ears wherein each ear has a first pivot point that aligns with a second pivot point of a connected one of said first set of four tubes and said sequences of three interconnected tubes.

20. The model hand according to claim 19 further comprising:
a plurality of holes through each of said first pivot point and said second pivot point and dielectric fasteners extending through said plurality of holes so as to couple said one or more ends of each of said first set of four tubes and each of said sequences of three interconnected tubes to said connected one of said first set of four tubes and said sequences of three interconnected tubes.

21. The model hand according to claim 1 wherein said fluid comprises a mixture of molasses and water.

22. The model hand according to claim 1 wherein said plurality of dielectric tubes comprise resin impregnated fiberglass tubes.

* * * * *